United States Patent [19]

Mehrotra et al.

[11] Patent Number: 4,820,663

[45] Date of Patent: Apr. 11, 1989

[54] WHISKER REINFORCED CERAMIC AND A METHOD OF CLAD/HOT ISOSTATIC PRESSING SAME

[75] Inventors: Pankaj K. Mehrotra, Greensburg; Joyce L. Swiokla, Ligonier; Elizabeth R. Billman, Pittsburgh, all of Pa.

[73] Assignee: Kennametal Inc., Latrobe, Pa.

[21] Appl. No.: 92,118

[22] Filed: Sep. 2, 1987

[51] Int. Cl.$^4$ ............ C04B 35/56; C04B 35/62; C04B 35/64; C04B 35/80

[52] U.S. Cl. ........................... 501/87; 501/88; 501/89; 501/92; 501/95; 264/60; 264/65; 264/66; 264/67; 427/248.1; 427/249; 427/255.7

[58] Field of Search ............ 501/87, 88, 89, 95, 501/92; 264/60, 65, 66, 67, DIG. 19; 427/248.1, 249, 255.7

[56] References Cited

U.S. PATENT DOCUMENTS

| 56,091 | 5/1887 | Mehrotra et al. | |
|---|---|---|---|
| 92,113 | 9/1887 | Mehrotra et al. | |
| 3,562,371 | 2/1971 | Bush | 264/65 |
| 4,104,782 | 8/1978 | Veeck et al. | 29/527.2 |
| 4,108,652 | 8/1978 | Ogawa et al. | 75/223 |
| 4,152,223 | 5/1979 | Wallace et al. | 204/37 R |
| 4,199,339 | 4/1980 | Grunke | 65/18 |
| 4,230,745 | 10/1980 | Betz et al. | 427/255.4 |
| 4,242,294 | 12/1980 | Huther et al. | 264/62 |
| 4,250,610 | 2/1981 | Wilbers et al. | 29/424 |
| 4,310,477 | 1/1982 | Uy et al. | 264/62 |
| 4,426,209 | 1/1984 | Sarin et al. | 501/98 |
| 4,497,874 | 2/1985 | Hale | 501/87 |
| 4,541,975 | 9/1985 | Honma et al. | 264/62 |
| 4,543,345 | 9/1985 | Wei | 501/95 |
| 4,615,735 | 10/1986 | Ping | 75/249 |
| 4,632,910 | 12/1986 | Lee et al. | 264/60 |
| 4,643,858 | 2/1987 | Mizutani | 264/65 |
| 4,652,413 | 3/1987 | Tiegs | 264/66 |
| 4,657,877 | 4/1987 | Becher et al. | 501/89 |

FOREIGN PATENT DOCUMENTS 0208910 1/1987 European Pat. Off. .
86/05480 9/1986 PCT Int'l Appl. .

OTHER PUBLICATIONS

Evans & Charles, "Fracture Toughness Determination by Indentation", J. American Ceramic Society, vol. 59, No. 7-8, pp. 371 and 372.

Primary Examiner—William R. Dixon, Jr.
Assistant Examiner—David M. Brunsman
Attorney, Agent, or Firm—John J. Prizzi

[57] ABSTRACT

A method of manufacturing a shaped ceramic article by hot isostatic pressing comprising the following steps: (a) forming a compact of sinterable ceramic compositions, (b) applying a coating to the compact by vapor deposition of a ceramic composition that does not become vitreous before or during the subsequent isostatic pressing step, and (c) heating and isostatically pressing the coated compacts in an atmosphere that reacts with the coating and/or the compact at pressing temperatures and pressures to cause the compact to approach theoretical density. The method is suitable for forming a fired ceramic compact having a whisker loading in excess of about 12.5 volume percent with substantially isotropic properties due to a substantially random orientation of the whiskers.

50 Claims, 3 Drawing Sheets

WHISKER REINFORCED CERAMIC AND A METHOD OF CLAD/HOT ISOSTATIC PRESSING SAME

BACKGROUND OF THE INVENTION

Special ceramic compositions are manufactured by sintering ceramic powders. There has been a continual search for sintering processes that will provide a sintered compact that approaches theoretical density at the lowest possible sintering temperatures and in the shortest possible length of time. Two processes, uniaxial hot pressing and hot isostatic pressing ("hipping"), are commonly used to fully densify ceramic compositions.

With uniaxial hot pressing, the powders are compacted in graphite molds that are heated, for example, by a high frequency furnace. See U. S. Pat. No. 4,657,877. The hot pressing process has a number of drawbacks: Hot pressing is a labor intensive and time consuming process, and complex shapes are not easily formed. For example, it is not easy to form shapes with a central opening therein. Finally, the uniaxial pressure applied during uniaxial hot pressing affects the grain structure of the sintered product such that some of the properties are anisotropic.

With hot isostatic pressing, the powders are usually precompacted and then the surface of the compact is, in some manner, sealed. The shapes are heated in a hot gas at high pressure. The gas transmits pressure to the compact because of the impervious surface. Hot isostatic pressing may take place at very high pressures for shorter times or at lower pressures for longer times. The particular approach to hot isostatic pressing depends upon the nature of the compact.

A number of techniques have been investigated for sealing the surfaces of the compacts. For example, it is sometimes possible to presinter the compact to sufficiently seal the surface of the compact prior to hot isostatic pressing. See U.S. Pat. Nos. 3,562,371 and 4,652,413. It is sometimes possible to encapsulate the compact in a flexible refractory metal casing that is evacuated and sealed around the compact prior to hot isostatic pressing. See the following patents: U.S. Pat. No. 4,230,745 (dense surface coating of a silicon metal melt), U.S. Pat. No. 4,152,223 (metallic envelope that is not removed after hipping) and U.S. Pat. No. 4,108,652 (packing presintered compact in metal powder, chloride salt and crushed refractory material and heating to form an encapsulating metal coating). Yet another technique for sealing the surface of the compact is to apply a glass or glaze to the surface that is viscous at the hot isostatic pressing temperatures. See the following patents: U. S. Pat. Nos. 4,250,610, 4,242,294, 4,199,339 and 4,104,782. For small compacts of a complex shape none of the prior art alternatives may be acceptable. Certain powders simply will not presinter sufficiently to seal the surface thereof. Metal casing is prohibitively expensive and the use of a glaze or glass may contaminate the compact with elements that are deleterious to compact properties.

Ceramic cutting tools with a substantial second phase comprising carbide whiskers have recently been introduced. Typically, these compositions are formed by hot pressing. See Wei U.S. Pat. No. 4,543,345 which teaches alumina-silicon carbide whisker compositions and teaches compaction by hot pressing. These tools are comprised of between 30 to 36 volume percent carbide whiskers. It is not possible to compact a composition with a substantial carbide whisker phase by simply presintering followed by hot isostatic pressing. See Becher and Tiegs U.S. Pat. No. 4,657,877. In some way, the whiskers prevent the adequate densification and formation of an impervious surface during the presintering.

Again, uniaxial hot pressing of whisker reinforced ceramics results in products having properties that are not all isotropic. Anistropic properties develop as a result of the orientation of the whisker phase perpendicular to the pressing axis during pressing.

SUMMARY OF THE IVNENTION

It is an object of this invention to provide a process for hot isostatic pressing of ceramic compacts that cannot be presintered to provide an impervious surface and without using metal or glass encapsulation.

It is an advantage according to this invention that ceramic articles can be formed by hot isostatic pressing without encapsulation in metal or glass.

It is a further advantage according to this invention that ceramic cutting tool compositions having a second phase comprising a substantial volume of ceramic (e.g., carbide) whiskers can be formed by hot isostatic pressing.

It is yet another object to provide a carbide whisker reinforced fired ceramic product having a heavy (greater than about 12.5 or 15 volume percent) whisker loading and yet a substantially random orientation of whiskers in the fired product. The random orientation of the whiskers may be measured by the X-ray parameter of whisker orientation to be explained herein. The parameter preferably falls within the range 0.66 to 1.5 and most preferably falls within the range 0.8 and 1.25. The fired ceramic product has a density which exceeds 95 percent and, preferably, exceeds 97 percent of theoretical.

Briefly, according to this invention there is provided a method of manufacturing a shaped ceramic article by hot isostatic pressing comprising the following steps: (a) forming a compact of sinterable ceramic composition, (b) applying a coating to the compact by vapor deposition of a ceramic composition that does not become vitreous before or during the subsequent isostatic pressing step, and (c) heating and hot isostatic pressing the coated compacts in an atmosphere that reacts with the coating and/or the compact at pressing temperatures and pressures to cause the compact to approach theoretical density (i.e., exceeds 95 percent of theoretical).

The method is particularly suitable for forming a compact of sinterable ceramic composition having 5 to 40, preferably 10 to 35 volume percent carbide whiskers. The method is suitable for forming a fired ceramic compact having a whisker loading in excess of about 12.5 or 15 volume percent with substantially isotropic properties due to a substantially random orientation of the whiskers. The method may also be used for forming ceramic compacts with less than about 12.5 volume percent whiskers, but these may also be made by other methods. The method has particular advantages in forming a compact approximating the desired shape of a cutting tool. In this case the coating is ground away from the isostatically pressed compact and the compact is further shaped into a cutting tool insert having a cutting edge formed at the junction of a rake face and a flank face.

The methods according to this invention are particularly useful when the ceramic compact is comprised to a large extent of ceramic powders and carbide whiskers and the coating applied by vapor deposition is a refractory nitride, such as titanium nitride. Vapor deposition includes chemical vapor deposition and physical vapor deposition. Preferably, the coating is between 5 and 50 microns thick and more preferably between 10 and 30 microns thick. In a most specific embodiment, chemical vapor deposition takes place at about 1000° C. by reaction of $TiCl_4$, $H_2$ and $N_2$. In this case, a TiN coating is formed which is substantially unreactive with the presintered compact. In a preferred embodiment, the gas used in pressuring the coated compact during hot isostatic pressing is nitrogen. More preferably, the heating and isostatic pressing take place in a nitrogen atmosphere at a pressure from 50 to 30,000 psi and temperatures from 1500 to 1800° C., most preferably 1700 to 1800° C.

It is advantageous in most instances to provide an additional presintering step near atmospheric pressure and in a neutral or reactive atmosphere before the coating and hot isostatic pressing steps. This additional step does not make the following vapor coating step unnecessary with compacts such as those that comprise a high percentage of ceramic whiskers but tends to improve the properties of the hot isostatically pressed compacts and also tends to increase the yield (percentage of compacts adequately densified by the hot isostatic pressing).

In one embodiment of this invention, a ceramic composition comprising powdered oxides and carbide whiskers, especially silicon carbide or titanium carbide, is compacted, presintered, coated with a nitride, especially titanium nitride, and hot isostatic pressed in a nitrogen atmosphere to near theoretical density.

According to yet another specific embodiment, a multiple layer coating is applied to the compact prior to hot isostatic pressing. Each layer has a different composition. For example, the layer adjacent to the compact may be an oxide that has a coefficient of thermal expansion between that of the fired compact and the outer coating. Specifically, an inner coating applied by chemical vapor deposition may be alumina and the outer coating applied by either chemical vapor deposition or physical vapor deposition or both may be titanium nitride.

The sinterable ceramic, in addition to the carbide whiskers, comprises a finely divided component that after sintering provides the matrix between the whiskers. The finely divided component is preferably an oxide ceramic and most preferably high purity alumina. Other finely divided materials for providing the matrix phase comprise, for example, mullite, alumina-zirconia blends, silicon nitride, sialons and $B_4C$.

DESCRIPTION OF THE DRAWINGS

Further features and other objects and advantages will become apparent from the following description made with reference to the drawings in which.

DESCRIPTION OF THE PREFERRED EMBODIMENTS

Ceramic cutting tool inserts were prepared by hot isostatic pressing alumina and silicon carbide batches in which the silicon carbide was in the form of whiskers. The pressed compacts were tested for inherent properties and for suitability for machining. Suitability for machining was determined by fabrication of tool inserts from the compacts and using the tool inserts under severe machining conditions.

The starting materials for the preparation of the cutting tool inserts were premilled alumina powder, silicon carbide whisker powder, yttrium oxide powder ($Y_2O_3$) and magnesia powder (MgO). The powders were blended together to form batches having the volume compositions set forth in Table 1.

TABLE 1

| Raw Material | Mix Composition in Volume Percent | | | | |
| --- | --- | --- | --- | --- | --- |
| | Mix A | Mix B | Mix C | Mix D | Mix E |
| Alumina | 88 | 83 | 68 | 63 | 58 |
| SiC whiskers | 10 | 15 | 30 | 35 | 40 |
| $Y_2O_3$ | 1 | 1 | 1 | 1 | 1 |
| MgO | 1 | 1 | 1 | 1 | 1 |

Typically, a very high purity alumina is used, say 99 percent by weight pure. Alcoa's A16-SG is an acceptable ingredient in the above-described mixes. The alumina is milled to a median particle size of 0.5 to 0.6 microns before blending with the ultrasonically dispersed silicon carbide whiskers. Typically, the silicon carbide whiskers will have a purity in excess of 98 weight percent. The silicon carbide whiskers may have a length of 20 to 150 microns with a diameter ranging from 0.3 to 0.7 microns. The aspect ratio will vary from 20 to 70.

The mixes of Table 1 were each blended together to form a homogenous blend and then cold isostatically compacted to form green compacts. Thereafter, the green compacts were presintered under one atmosphere pressure in argon gas between 1700 and 1800° C. The presintered compacts were then encapsulated with a TiN coating by standard chemical vapo deposition (CVD) techniques at 1000° C. at subatmospheric pressure to provide a coating that was between 15 and 30 microns thick. The thickness of the coating was determined from polished sections. The coated or clad compacts were then hot isostatically pressed in a nitrogen gas atmospheric at between 15,000 and 20,000 psi at 1750° C. The parts were then ground to remove the cladding.

Figure 1:
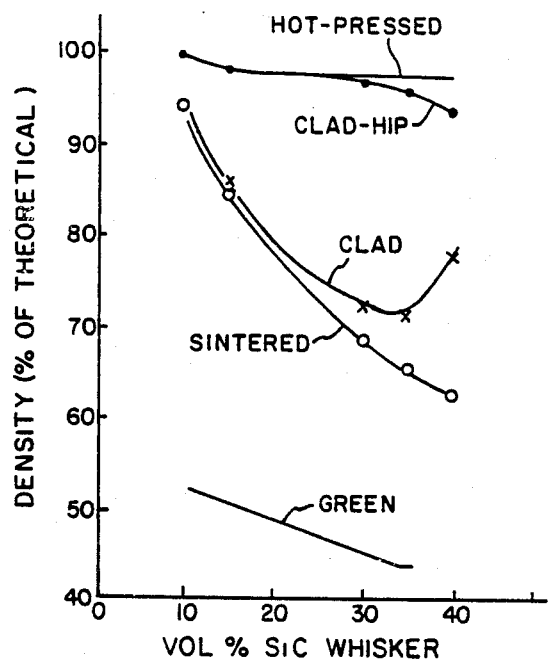
FIG. 1 is a plot of density (percent of theoretical) versus volume percent silicon carbide whisker content at various processing stages (green, presintered at 1750° C., CVD clad, and hot isostatically pressed) for ceramic compositions of interest.

The densities of each compact were determined in the green, sintered, clad and isostatically pressed condition. Referring to FIG. 1, the green density of these compacts ranged from 44 to 53 percent of theoretical, dropping with increasing whisker content. On presintering, the densities were raised to range from 62 to 94 percent of theoretical. For compositions made from Mix A (the lowest whisker content), the presintered density may have been sufficient to permit hot isostatic pressing without cladding. But, for the compositions made from Mixes B to E (15 or more volume percent whiskers and presintered densities less than 90 percent), cladding is essential prior to hot isostatic pressing. The compositions were densified by hot isostatic pressing—those with less than 25 volume percent whiskers to a density better than or equal to that achieved by hot pressing. For compositions with higher whisker contents, the densities were somewhat lower than that achieved with hot pressing. However, the manufacturing advantages outweigh the disadvantages of somewhat lower density.

Figure 2:
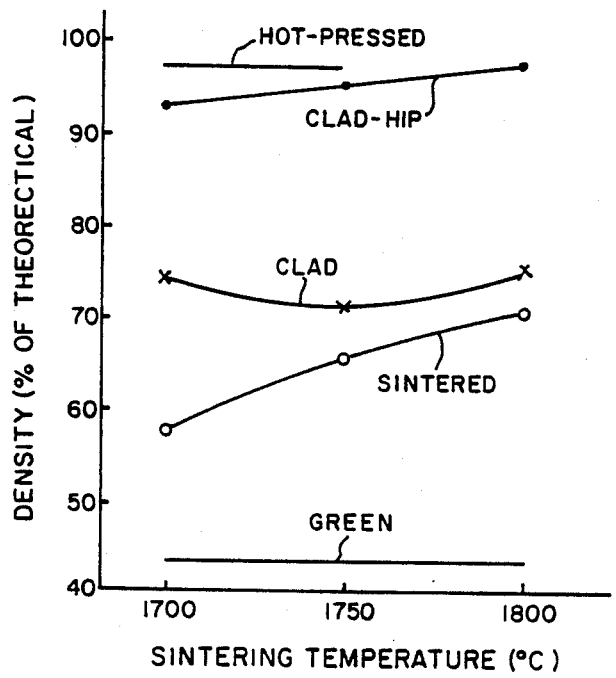
FIG. 2 is a plot of density (percent of theoretical) versus presintering temperature (° C.) for a composition comprising 35 volume percent whisker content at various processing stages.
Figure 3:
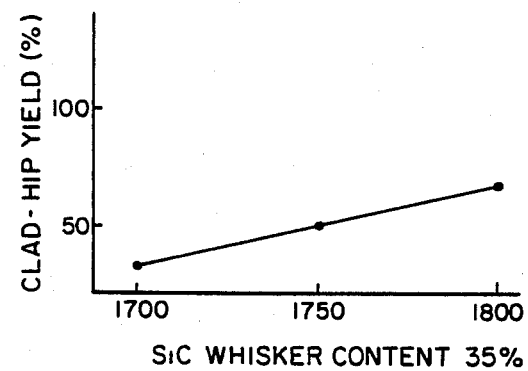
FIG. 3 is a plot of yield (percent of compacts densified during the hot isostatic pressing step) versus presintering temperature for a composition comprising 35 volume percent whisker content.

Referring to FIG. 2, the effect of increasing the presintering temperature is to increase the presintered density and to increase the final hot isostatically pressed density. The yield, i.e., the percentage of compacts that show at least some densification (versus no densification at all) during hot isostatic pressing is clearly increased, however, by increasing the presintering temperature as shown by FIG. 3. The quality of the coating applied by CVD, in the case of the examples herein the titanium nitride coating, plays an important role in achieving better yields. Coating can be too thick resulting in flaking away of the coating from the presintered compact. Applicants have found that if the presintered and clad density exceeds 80 percent of theoretical, then yield will be near 100 percent. If the presintered and clad density drops to between 70 and 80 percent, the yield is not as good because the densification behavior during hot isostatic pressing is inconsistent. Notwithstanding lower yields, the ability to densify compositions containing over 30 volume percent whiskers without uniaxial hot pressing apparatus is a substantial advantage.

Figure 4:
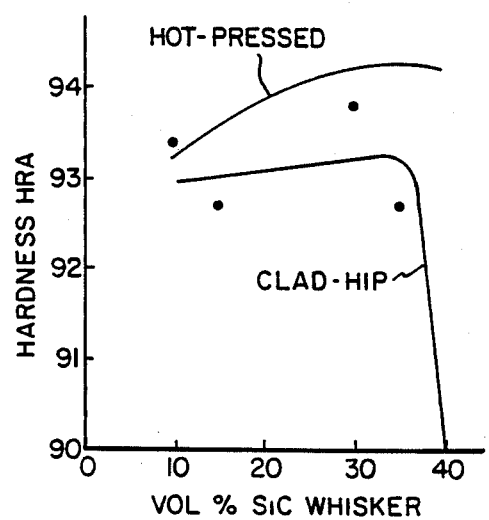
FIG. 4 is a plot of hardness (Rockwell A) after presintering at 1750° C., CVD cladding and hot isostatic pressing versus volume percent of whisker content and a plot of hardness versus whisker content for comparative hot pressed compositions.
Figure 5:
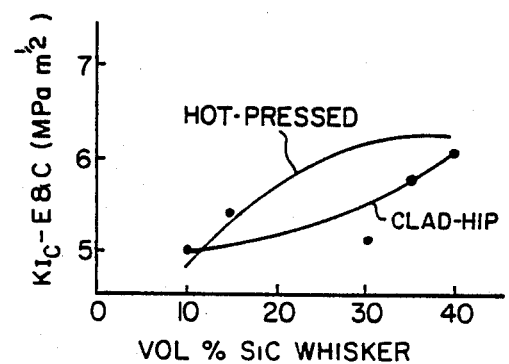
FIG. 5 is a plot of toughness ($K_{IC}$ values measured in accordance with Evans and Charles, "Fracture Toughness Determination by Indentation," *J. American Ceramic Soc.*, Vol. 59, No. 7–8, pp. 731 and 372) after presintering at 1750° C., CVD cladding and hot isostatic pressing versus percent of whisker content and a plot of comparative data for the hot pressed compositions.
Figure 6:
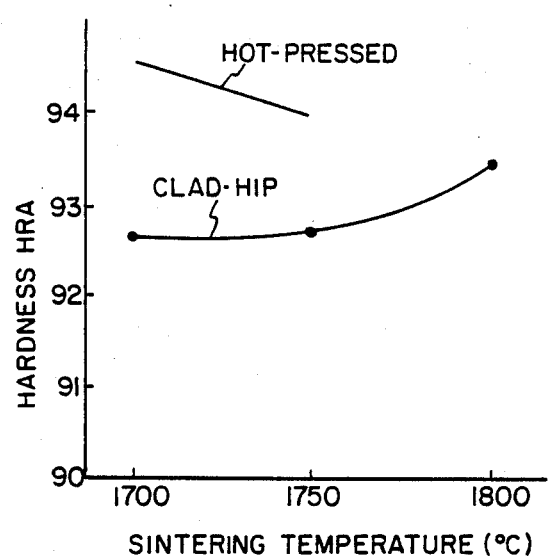
FIG. 6 is a plot of hardness (Rockwell A) after presintering at 1750° C., CVD cladding and hot isostatic pressing versus presintering temperature for a composition comprising 35 volume percent whisker content and a plot of comparative data for hot pressed compositions at various hot pressing temperatures.
Figure 7:
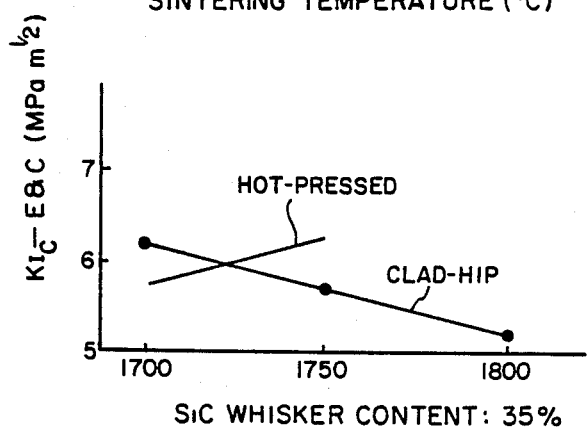
FIG. 7 is a plot of toughness ($K_{IC}$ Evans and Charles) versus presintering temperature for a hot isostatically pressed composition comprising 35 volume percent whisker content and a plot of comparative data for hot pressed compositions at various hot pressing temperatures.

The hardness and toughness properties of compacts made according to the process of this invention are shown in FIGS. 4, 5, 6, and 7. Referring to FIG. 4, hardness is more or less the same for all compositions up to 35 percent whiskers and then significantly drops off. Up to 35 percent whisker content the hot isostatically pressed compacts are nearly as hard as the same compositions made by uniaxial hot pressing. Referring to FIG. 5, toughness is improved in both isostatically pressed and hot pressed compacts as the content of whiskers increases. Indeed, this is the reason for adding the second phase to the compacts. Toughness is comparable for both processes with somewhat better toughness for the uniaxial hot-pressed compacts. Referring to FIGS. 6 and 7, it can be seen that increasing the presintering temperature results in some increase in hardness and some decrease in toughness for compacts hot isostatically pressed according to this invention.

Figure 8:
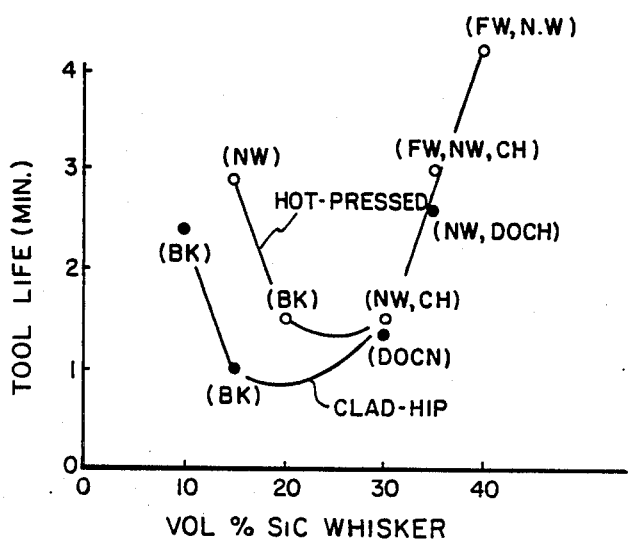
FIG. 8 is a plot of tool-life (in minutes cutting Inconel 718 at 1000 sfm and 0.01 ipr with a depth of cut of 0.1 inch) versus volume percent silicon carbide whiskers in alumina compositions CVD clad and hot isostatically pressed according to this invention and a plot of tool-life versus whisker content for comparative hot pressed compositions.

To perform metal cutting tests, SNG-433T (nominally 0.004 inches by 20° chamfer) style cutting tool inserts were ground from compacts made according to this invention from the compositions of Mixes A to D. The cutting conditions were severe; namely, the workpiece was Inconel 718, cutting speed was 1000 surface feet per minute (sfm) at a feed rate of 0.01 inch per revolution (ipr), with a depth of cut equal to 0.1 inch, and a lead angle of 45°. All hot isostatically pressed compacts were presintered at 1750° C. prior to CVD TiN cladding. For comparison, tool inserts made of the same composition by uniaxial hot pressing 1750° C. were also tested. Referring to FIG. 8, tool-life and the mode of failure are indicated. NW means nose wear failure; BK means breakage failure; FW means flank wear failure; DOCN means depth of cut notch failure; and CH means chip failure. For compacts made from the compositions with 20 volume percent silicon carbide whiskers and less, the tool failure mode is predominantly fracture, whereas wear is the most common mode of failure for higher whisker contents. Both uniaxial hot-pressed and hot isostatically pressed compacts according to this invention show similar tool-life for compositions with more than 30 volume percent whiskers.

While applicants do not wish to be bound by any particular theory the following explanation of the process is offered. Titanium nitride appears to deposit on the open pores near the surface of the presintered compacts during the chemical vapor deposition. This causes a density increase with cladding which is directly proportional to presintered porosity. The preferred chemical vapor deposition reaction is between $TiCl_4$, $H_2$ and $N_2$ at about 1000° C. At this temperature a possible reaction with the SiC whiskers could result in the formation of $Si_3N_4$ and carbon. However, very little SiC is converted by this reaction during CVD. On cooling, cracks may appear in the TiN coating due to the differential thermal contraction. The cracks should prevent the isostatic pressing of the clad compacts from working. Indeed, if argon is used as the isostatic pressing medium, hot isostatic pressing will not be effected. However, by using nitrogen gas as the isostatic pressing medium pressing does take place. Apparently, at hot isostatic pressing temperatures and pressures the nitrogen gas reacts sufficiently rapidly with the silicon carbide. This results in a volume increase of 18 percent (or 27 percent if solid carbon remains as a reaction product). This increase in volume near the cracks closes the remaining surface pores allowing the application of isostatic pressure to densify the compact.

A measure of whisker orientation is required to fully appreciate the advantages of isostatic pressing of compositions with silicon carbide whiskers therein. To this end, the X-ray parameter of whisker orientation was developed. This parameter is a measure of the degree of orientation of the whiskers in a fired ceramic compact. A parameter of one is an indication of perfectly random orientation. A parameter of more than one or less than one is an indication of orientation. The further the parameter is from one, the more oriented the whiskers in the compact.

The X-ray parameter is obtained by observing relatively strong X-ray diffraction peaks in a diffractometer corresponding to two crystallographic planes of the crystal structure of the whisker which planes form a dihedral angle that is relatively large, preferably as close as possible to 90° C. In the case of silicon carbide whiskers, it is desirable to select the peaks corresponding to the {220} and {111} planes.

X-ray diffraction readings are taken by irradiating two surfaces that are substantially perpendicular. For each surface irradiated, a ratio of the intensity of the two peaks selected for observation is computed. Hence, for the first surface irradiated the ratio of intensities would be computed by the following formula:

$P \text{ (perpendicular)} = I\{220\}/I\{111\}.$

For the second surface irradiated, the ratio would be computed by:

$P \text{ (parallel)} = I\{220\}/I\{111\}.$

The X-ray parameter of whisker orientation is then given as the ratio of the two ratios as follows:

$\text{Parameter} = P \text{ (perpendicular)}/P \text{ (parallel)}.$

The faces selected for irradiation are mutually perpendicular. In this work, the face parallel to the uniaxial hot pressing direction was chosen for the ratio P(parallel). When cutting tools are made from ceramic compacts, they have a large face known as the rake and a narrower face called the flank. The rake is generally perpendicular to the direction of pressing for compacts made by uniaxial hot pressing. As reported in this patent specification, for specimens made by either uniaxial pressing or according to this invention, the rake face was irradiatd for determination of the ratio P(perpendicular) and a flank face was irradiated for determining the ratio P(parallel).

The intensities of the selected peaks may be inverted in each of the above formulas for P(parallel) and P(perpendicular) (so long as the same peaks are used for the numerator of each) and/or the parameter may be formed by inverting the right hand side of the above formula. Hence, a parameter of 1.5 would become 0.666. Each indicates the same degree of orientation of the whiskers.

In the following tables data for X-ray parameter of orientation are set forth for fired ceramic compacts made according to this invention and for compacts made by traditional uniaxial hot pressing. The data includes the parameter for compacts having silicon carbide whisker loadings between 10 and 35 volume percent as indicated in the tables.

TABLE 2

| (V/O)SiC | Coated and Hot Isostatically Pressed | | |
|---|---|---|---|
| | P(perpendicular) | P(parallel) | Parameter |
| 10 | 50.0 | 57.9 | 0.86 |
| 10 | 61.5 | 82.4 | 0.75 |
| 15 | 33.3 | 36.7 | 0.91 |
| 15 | 41.0 | 45.5 | 0.90 |
| 15 | 40.0 | 34.2 | 1.17 |
| 35 | 35.7 | 36.5 | 0.98 |

TABLE 2-continued

| (V/O)SiC | Coated and Hot Isostatically Pressed | | |
|---|---|---|---|
| | P(perpendicular) | P(parallel) | Parameter |
| 35 | 43.5 | 47.6 | 0.91 |

TABLE 3

| (%)SiC | Hot Pressed | | |
|---|---|---|---|
| | P(perpendicular) | P(parallel) | Parameter |
| 15 | 75.9 | 41.2 | 1.84 |
| 20 | 60.9 | 40.4 | 1.85 |
| 25 | 58.5 | 32.9 | 1.78 |
| 30 | 66.3 | 31.8 | 2.09 |
| 35 | 62.1 | 30.7 | 2.02 |

Comparing the data in Tables 2 and 3 it is clear that the degree of whisker orientation is considerable in the hot pressed compacts as would be expected and the degree of orientation is substantially less in the case of compacts made according to this invention.

The orientation or not of the whiskers can be observed by microscopic inspection of polished surfaces of the faces corresponding to those irradiated with X-ray. For ceramic compacts made by uniaxial hot pressing, the polished surfaces parallel and perpendicular to the direction of pressing will appear markedly different. For ceramic compacts made according to this invention, perpendicular polished surfaces will appear more similar. Thus, in a nonquantitative way, the meaning of the X-ray parameter of orientation is confirmed. Moreover, the effect of the orientation of the whiskers upon certain physical properties of the ceramic compacts can be observed. When the Palmqvist fracture toughness test is conducted, a Vickers indentation is produced on the polished surface and the cracks propagating outwardly from the four corners of the indentation are measured. The longer the average crack, the less tough the composition. The ratio of the length of the cracks extending in perpendicular directions can be taken as a measure of the anisotropy of the toughness property. In the case of observing the cracks extending outwardly from the indentation of the face parallel to the direction of pressing of a whisker containing ceramic compact made by uniaxial hot pressing, the anisotropy is quite apparent. Whereas, the anisotropy measured in this manner is reduced in the present invention.

It is specifically contemplated that the present inventions may be used to fabricate substrate compositions described in P. K. Mehrotra et al copending application Ser. No. 092,113 which was concurrently filed with the present application, and P. K. Mehrotra et al copending application Ser. No. 056,091, filed on May 28, 1987.

Application Ser. No. 092,113 relates to articles of manufacture having a SiC whisker reinforced alumina matrix substrate which has an alumina coating bonded to its exterior surface. It has been found that these articles are useful as cutting inserts in the high speed rough machining of steels.

Application Ser. No. 056,091 relates to a cutting tool composed of a ceramic composition comprised of 50 to 90 volume percent alumina, 10 to 50 volume percent titanium carbide whiskers and up to 3 volume percent sintering aid residue.

The foregoing patent applications, and all other patents and publications referred to herein, are hereby incorporated by reference.

Having thus described the invention with the detail and particularly required by the Patent Laws, what is desired protected by Letters Patent is set forth in the following claims.

What is claimed is:

1. A method of achieving a density greater than 95% of theoretical in a shaped ceramic article incorporating a ceramic whisker phase therein by hot isostatic pressing comprising the steps of
   (a) forming a compact substrate of sinterable ceramic composition having at least 5 volume percent ceramic whiskers therein,
   (b) applying a coating to the compact substrate by vapor deposition of a ceramic composition that does not become vitreous before or during the subsequent isostatic pressing step, and
   (c) heating and isostatically pressing the coated compact substrate in an atmosphere that reacts with the coating and/or the compact substrate at temperatures and pressures to cause the compact to approach theoretical density.

2. A method of achieving a density greater than 95% of theoretical in a shaped ceramic article incorporating a carbide whisker phase therein by hot isostatic pressing comprising the steps of
   (a) forming a compact substrate of sinterable ceramic composition having at least 5 volume percent carbide whiskers therein,
   (b) applying a coating to the compact substrate by vapor deposition of a ceramic composition that does not become vitreous before or during the subsequent isostatic pressing step, and
   (c) heating and isostatically pressing the coated compact substrate in an atmosphere that reacts with the compact substrate at temperatures and pressures to cause the compact to approach theoretical density.

3. The method according to claim 2 wherein the carbide whiskers comprise 5 to 40 volume percent of the compact substrate.

4. The method according to claim 2 wherein the carbide whiskers comprise 10 to 35 volume percent of the compact substrate.

5. The method of according to claim 2 wherein the carbide whiskers are selected from the group consisting of silicon carbide and titanium carbide.

6. A method of achieving a density greater than 95% of theoretical in a ceramic cutting tool insert incorporating a ceramic whisker phase therein by hot isostatic pressing comprising the steps of
   (a) forming a compact substrate of sinterable ceramic composition having at least 5 volume percent ceramic whiskers therein substantially in the desired shape of the cutting tool,
   (b) applying a coating to the compact substrate by vapor deposition of a ceramic composition that does not become vitreous before or during the subsequent isostatic pressing step, and
   (c) heating and isostatically pressing the coated compacts in an atmosphere that reacts with the coating and/or the compact substrate at temperatures and pressures to cause the compact to approach theoretical density, and
   (d) grinding away the coating adhering to the isostatically pressed compact and further shaping the compact in the shape of a cutting tool insert if required.

7. The methods according to claims 1, 2, or 6 wherein the coating is titanium nitride applied by chemical vapor deposition.

8. The method according to claim 6 wherein the coating is between 5 and 50 microns thick.

9. The method according to claim 6 wherein the gas used during hot isostatic pressing is nitrogen.

10. The methods according to claims 1, 2, or 6 wherein the heating and isostatic pressing take place in a nitrogen atmosphere at pressures exceeding 10,000 psi and temperatures exceeding 1500° C.

11. The methods according to claims 1, 2, or 6 wherein an additional sintering step near atmospheric pressures and in a neutral or reactive atmosphere is performed before the hot isostactic pressing step.

12. The methods according to claims 1, 2, or 6 wherein the compact comprises powdered oxides and carbide whiskers.

13. The method according to claim 12 wherein the compact comprises powdered alumina and the carbide whiskers are selected from the group consisting of titanium carbide and silicon carbide 14. The methods according to claims 1, 2, or 6 wherein the coating deposited by chemical vapor deposition is a nitride.

15. The methods according to claims 1, 2, or 6 wherein the vapor depositions of the coating is brought about by chemical vapor deposition, physical vapor deposition or a combination thereof.

16. The methods according to claims 1, 2, or 6 wherein multiple layered coatings are applied to the compact and wherein each of said layers have a different composition.

17. The method according to claim 17 wherein the layer of the coating adjacent the compact substrate has a coefficient of thermal expansion intermediate that of the compact the next adjacent coating.

18. The method according to claim 17 wherein the layer of the coating adjacent the compact substrate is 2–4 microns thick and is comprised of alumina applied by chemical vapor deposition.

19. The method according to claim 6 wherein said sinterable ceramic composition contains 25 to 40 volume percent ceramic whiskers.

20. The method according to claim 6 wherein said sinterable ceramic composition contains 25 to 35 volume percent ceramic whiskers.

21. The method according to claim 1, 2, 6 or 20 wherein said method achieves a density of greater than 97% theoretical density in said shaped ceramic article.

22. The method according to claims 1 or 20 wherein said method achieves a density of greater than 97% theoretical density in said shaped ceramic article.

23. A method of achieving a density greater than 95% of theoretical in a shaped ceramic article incorporating a carbide whisker phase therein by hot isostatic pressing comprising the steps of
   (a) forming a compact of sinterable alumina based ceramic composition having at least 20 volume percent carbide whiskers selected from the group consisting of titanium carbide and silicon carbide therein,
   (b) heating the compact at near atmospheric pressures to presinter the compact in argon atmosphere,
   (c) applying a titanium nitride coating to the presintered compact by chemical vapor deposition at about 1000° C. which coating does not become vitreous before or during the subsequent isostatic pressing step, and (d) heating and isostatically pressing the coated compacts in a nitrogen atmosphere that reacts with the compact substrate at temperatures and pressures in excess of 1500° C. and 10,000 psi respectively to cause the compact to approach theoretical density.

24. A fired ceramic composition comprising a matrix phase and a carbide whisker phase, and a nitrogen containing phase formed as a reaction product of said carbide whisker phase with nitrogen, said carbide whisker phase forming 25 to 40 volume percent of said fired ceramic composition, the X-ray parameter of whisker orientation being within the range 0.66 to 1.5, and the density of the fired ceramic exceeding 95 percent theoretical.

25. The fired ceramic composition according to claim 21 wherein the carbide whisker phase is selected from the group consisting of silicon carbide whiskers and titanium carbide whiskers.

26. The fired ceramic composition according to claim 21 wherein the carbide whisker phase comprises 25 to 35 volume percent of said fired ceramic composition and said carbide whiskers are selected from the group consisting of silicon carbide and titanium carbide.

27. The fired ceramic composition according to claim 21 wherein the matrix phase comprises oxide ceramics including alumina.

28. The fired ceramic composition according to claim 24 wherein the matrix phase comprises a ceramic material selected from the group consisting of high purity alumina, mullite, alumina-zirconia mixtures, sialons, silicon nitride and boron carbide.

29. The fired ceramic composition according to claims 25 or 26 wherein the carbide whiskers have a length between 20 and 150 microns and a diameter between 0.3 and 1.7 microns.

30. The fired ceramic composition according to claim 24 wherein the X-ray parameter of whisker orientation is in the range of 0.8 to 1.25.

31. The fired ceramic composition according to claim 21 wherein the density of the fired ceramic exceeds 97 percent theoretical.

32. A cutting tool comprising: a fired ceramic composition having a matrix phase, a ceramic whisker phase and a nitrogen containing phase formed as a reaction product of said ceramic whisker phase with nitrogen; said ceramic whisker phase forming 25 to 40 volume percent of said fired ceramic composition; and wherein the x-ray parameter of whisker orientation being within the range of 0.66 to 1.5; the density of said fired ceramic composition exceeding 95 percent theoretical; and said fired ceramic composition having a cutting edge at a juncture of a rake face and a flank face.

33. The cutting tool according to claim 32 wherein the density of said fired ceramic composition exceeds 97 percent theoretical.

34. The cutting tool according to claim 33 wherein said whisker phase includes a carbide whisker phase.

35. The cutting tool according to claim 33 wherein said carbide whisker phase is selected from the group consisting of silicon carbide whiskers and titanium carbide whiskers.

36. The cutting tool according to claim 33 wherein said whisker phase includes carbide whisker phase which forms 25 to 35 volume percent of said first ceramic composition.

37. The cutting tool according to claim 33 wherein said matrix phase comprises oxide ceramics including alumina.

38. The cutting tool according to claim 33 wherein the matrix phase comprises a ceramic material selected from the group consisting of alumina, mullite, alumina-zirconia mixtures, sialons, silicon nitride and boron carbide.

39. The cutting tool according to claim 34 wherein the carbide whiskers having a length between 20 and 150 microns and a diameter between 0.3 and 0.7 microns.

40. The cutting tool according to claim 33 wherein the x-ray parameter of whisker orientation is in the range of 0.8 to 1.25.

41. The cutting tool according to claim 33 wherein said matrix phase consists essentially of alumina.

42. The cutting tool according to claim 40 wherein said matrix phase consists essentially of alumina.

43. The cutting tool according to claim 30 wherein said whisker phase consists essentially of silicon carbide whiskers and said silicon carbide whiskers form 25 to 35 volume percent of said fired ceramic composition.

44. The cutting tool according to claim 37 wherein said whisker phase consists essentially of silicon carbide whiskers and said silicon carbide whiskers form 25 to 35 volume percent of said fired ceramic composition.

45. The cutting tool according to claim 41 wherein said whisker phase consists essentially of silicon carbide whiskers and said silicon carbide whiskers form 25 to 35 volume percent of said fired ceramic composition.

46. The cutting tool according to claim 42 wherein said whisker phase consists essentially of silicon carbide whiskers and said silicon carbide whiskers form 25 to 35 volume percent of said fired ceramic composition.

47. The cutting tool according to claim 33 wherein said matrix phase consists essentially of alumina and zirconia.

48. The cutting tool according to claim 40 wherein said matrix phase consists essentially of alumina and zirconia.

49. The cutting tool according to claim 37 wherein said matrix phase consists essentially of alumina and zirconia.

50. The cutting tool according to claim 44 wherein said matrix phase consists essentially of alumina and zirconia.

* * * * *